United States Patent Office 3,313,628
Patented Apr. 11, 1967

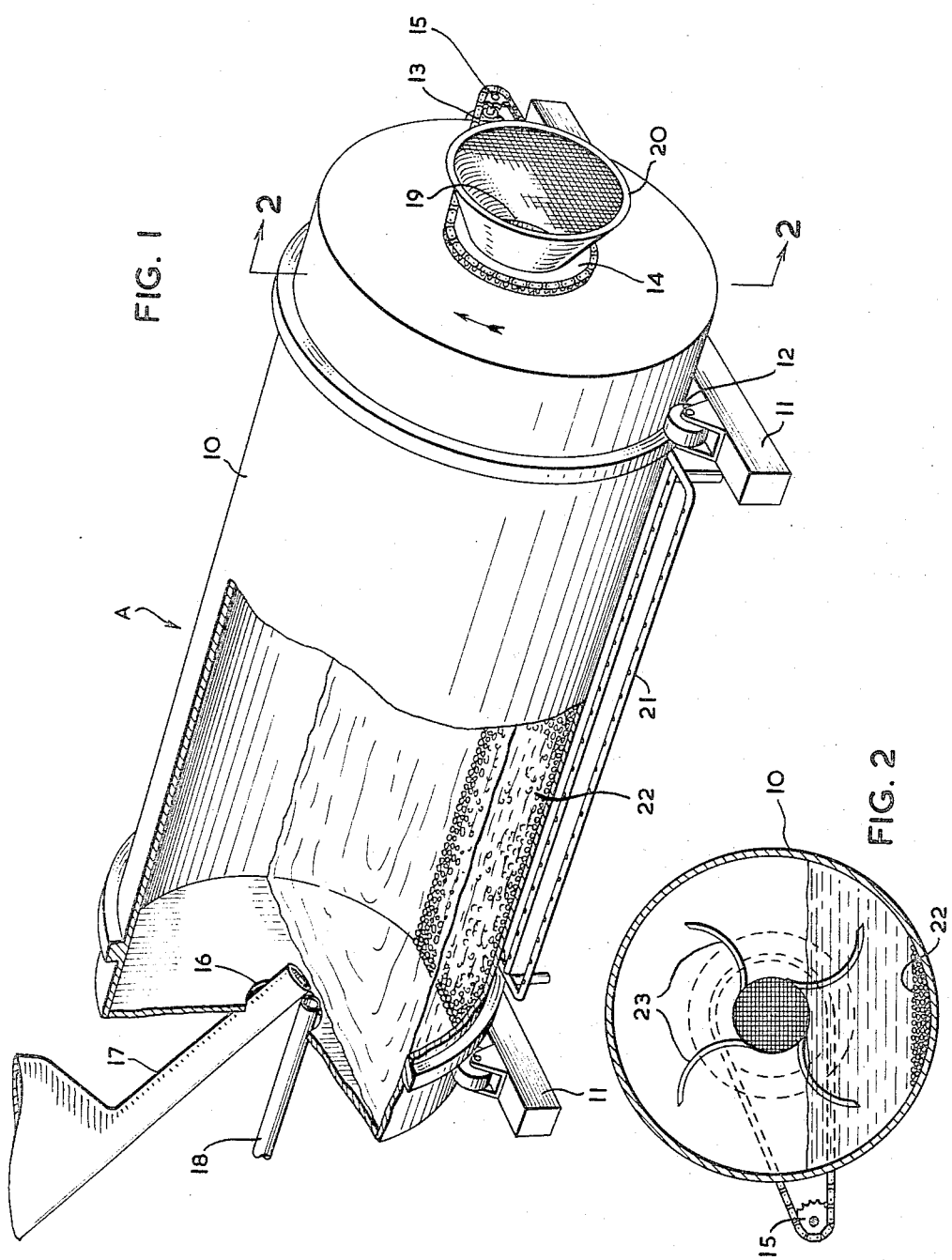

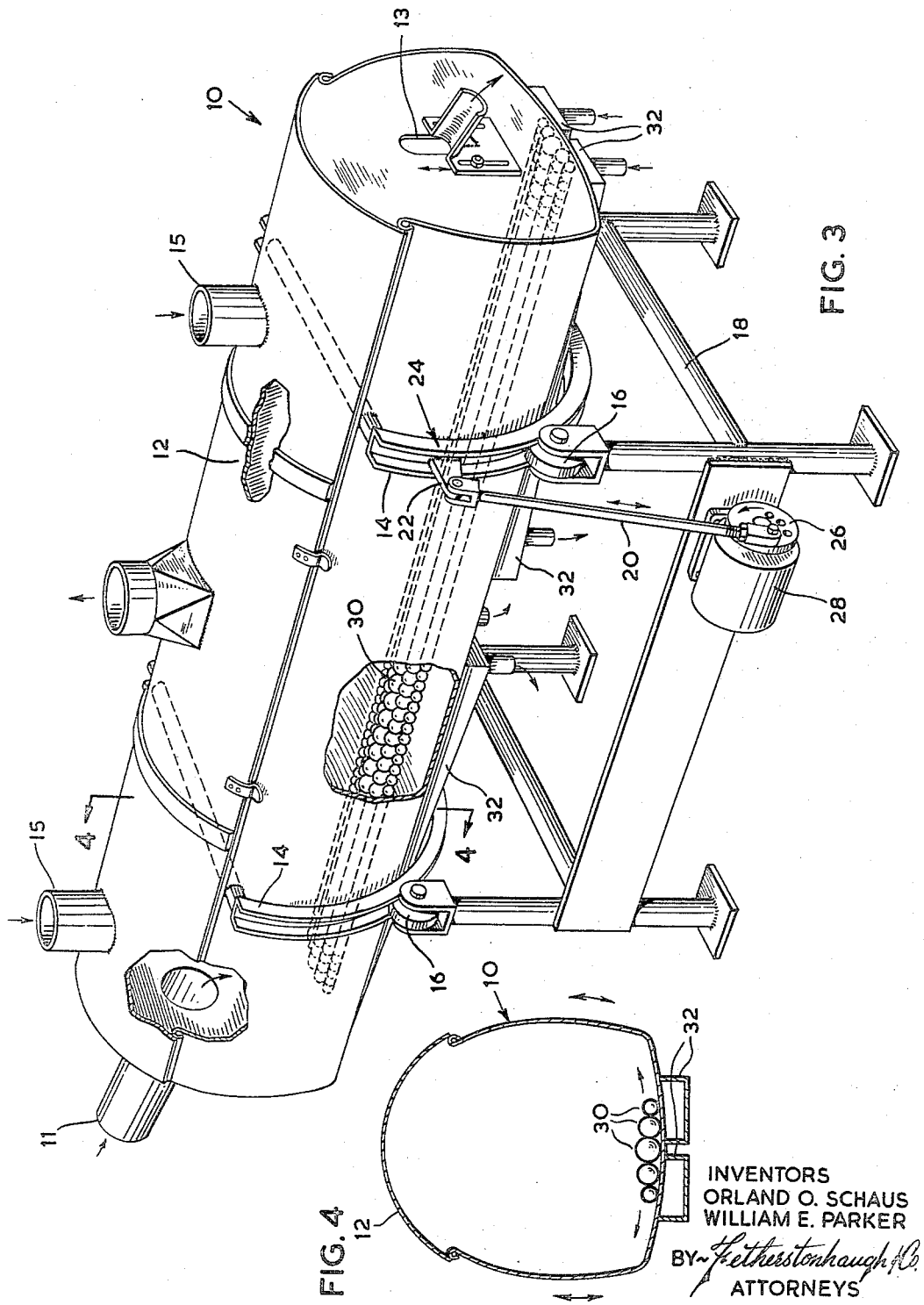

3,313,623
ELIMINATION OF SCALE FORMATION IN CONTINUOUS KETTLE BOILING OF BREWERS' WORT
Orland O. Schaus and William E. Parker, Toronto, Ontario, Canada, assignors to Canadian Breweries Limited, Toronto, Ontario, Canada
Filed July 1, 1963, Ser. No. 291,615
Claims priority, application Great Britain, Oct. 24, 1962, 40,208/62
1 Claim. (Cl. 99—52)

This invention relates to a process and apparatus for the continuous boiling of wort including continuous elimination of protein scale.

For use in the continuous brewing of beer and to replace the usual batch kettle, the present invention provides, preferably, a substantially horizontally disposed rotating cylinder heated by suitable means and through which wort is caused continuously to pass with provision for continuously adding hops thereto and which are continuously screened from the wort as the processed wort is discharged so that the processed wort may be continuously produced and fed to other processing vessels in the brewing system. Difficulty, however, is encountered by formation of scale on the interior of the cylinder caused by protein material and which will so accumulate that heat transfer drops to the point where boiling ceases. Consequently, this continuous processing requires for success a means of continuously and effectively removing scale formation on the interior of the cylinder or surface over which the wort passes. Wiping blades are not effective and would involve, by contrast to the present proposal, extra mechanism and, as a result, substantial maintenance cost. We have found preferably that, by introducing to the cylinder several inches of small steel balls, the attrition achieved thereby as a result of rotation of the cylinder has the effect of either removing the scale or preventing its adherence so that the processed wort continuously discharged from the end of the cylinder may be simultaneously screened to eliminate the spent hops and scale of large enough particle size and the resulting hopped wort can be subjected to further screening, centrifuging or the like to remove remaining scale and/or other particles requiring elimination from the wort.

In its broadest aspect, the invention generally embodies the continuous boiling of wort wherein wort is caused to flow at a predetermined rate over a heat conducting surface from one end thereof to the other in a predetermined path, heating said surface to cause said wort to boil during its passage thereover, moving said surface in a direction substantially transverse to the path of flow of said wort, maintaining on said surface in the path of flow of said wort a bed of abrading elements capable of wiping contact with said surface during its movement as to create attrition whereby to eliminate adherence to said surface of protein scale, created in the boiling of said wort and continuously discharging said boiled wort. Preferably, hops are continuously added to the wort as spent hops continuously screened therefrom as the wort discharges. Preferably also, the process is carried out in apparatus embodying a continuously rotated substantially horizontally disposed cylinder having a wort and hops inlet at one end and a discharge outlet at the opposite end including screening means.

The invention will be clearly understood by reference to the following detailed specification taken in conjunction with the accompanying drawings.

In the drawings:

FIGURE 1 is a perspective view partly in section of a rotatable cylinder illustrating the manner in which wort and hops are introduced thereto and discharged therefrom with the use of a means of subjecting the interior surface of the cylinder to attrition;

FIGURE 2 is a transverse section taken substantially along the line 2—2 of FIGURE 1;

FIGURE 3 is a perspective view of an alternative wort boiling vessel according to this invention; and FIGURE 4 is a sectional view taken along the line 4—4 of FIGURE 3.

Referring to FIGURES 1 and 2 of the drawings which illustrate a form of apparatus, A indicates the apparatus generally as a whole which is comprised by a substantially horizontally disposed rotatable cylinder 10 suitably supported on frame members 11 or the like, including roller means 12 for permitting practical rotation of the cylinder. The cylinder is rotated in any suitable manner such as by the drive chain 13, driven sprocket 14 and drive sprocket 15 operated from a suitable power source such as an electric motor. The cylinder is formed with an inlet opening 16 at its inlet end for passage therethrough of a hop conduit 17 and wort conduit 18 so that hops and wort may be continuously supplied at a predetermined rate. The opposite end of the cylinder is formed with a discharge outlet 19 surrounded by the frusto-conical screen 20 which projects outwardly from the discharge end of the cylinder whereby hops, wort and scale discharging from the outlet may be simultaneously screened by the screen 20, the screened material being discharged separately and the screened wort being collected in a suitable manner.

The rotating cylinder is continuously heated by any suitable means such as by the burner 21 so that the hopped wort is subjected to boiling as required. The flow of materials through the cylinder may, of course, be controlled by internal baffling and control feed rates as to achieve desired processing during its time of passage from inlet to discharge. In the lower area of the cylinder, several inches of small, preferably steel, balls 22 are included or other suitable abrading media which, due to tumbling action, subjects the interior surface of the cylinder to continuous attrition which will have the effect of removing scale therefrom caused from protein material or will prevent its adherence thereto so that, in result, there will be no drop in heat transfer to cause boiling to cease which otherwise would develop as scale formed on the interior walls of the cylinder. While it is preferred to employ small steel balls for this purpose, other means of causing attrition could be employed such as ceramic particles, pebbles, rods and the like. In result, therefore, the wort is hopped and boiled in a continuously flowing stream while eliminating scale formation so that fully processed wort is continuously discharged from discharge outlet 19 and passed through screen 20 and collected, while spent hops, scale and other screenable foreign particles are discharged and collected beyond screen 20. The wort, of course, will be subjected to further screening, centrifuging or the like as may be required. Preferably, to provide for efficient discharge of the spent hops with the wort, a plurality of blades or hop lifters 23 are incorporated in the discharge end of the cylinder such as shown in FIGURE 2 as to have the effect of lifting the hops from the wort and causing their discharge efficiently with the out-flowing wort. It will be obvious, of course, that the process may be employed for the continuous boiling of wort apart from hopping if desired, and that the preferred form of apparatus might be varied and could, for instance, take the form of an oscillating trough.

In FIGURES 3 and 4 of the drawings, the wort boiling vessel is mounted for an oscillating motion. In this case, the elongated wort boiling vessels 10 with wort inlet 11, wort outlet 13, lid 12 and hop inlets 15, carries tracks 14 which rest on rollers 16 of the frame 18. A connecting rod 20 pivotally connects at one end with a bracket 22 on the wort boiling vessel 10 as at 24 and at its other end with a wheel 26 that is rigidly mounted on the output shaft of the drive motor 28. It will be apparent that, as the drive motor 28 operates to turn wheel 26, an oscillating motion will be imparted to the wort boiling vessel through the shaft 20.

Abrading elements 30, preferably in the form of steel balls, rest on the bottom surface of the wort boiling vessel 10 and are adapted to move thereacross as the vessel is oscillated to abrade the heated portion of the surface and prevent a build-up thereon of wort protein caused by the boiling of the wort in process.

The manner of boiling the wort is capable of considerable variation, as indicated above. In FIGURE 1, for example, heaters have been illustrated. In FIGURE 3, the wort is boiled by means of jackets for steam 32 as it passes through the elongated wort processing vessel in continuous fashion.

In result, it will be clear that the continuous hopping and boiling of wort is readily achieved in a very simple manner.

What we claim as our invention is:

A process for continuously boiling wort comprising the steps of continuously passing the wort through an elongated vessel having its longitudinal axis substantially horizontal and abrading elements on the bottom thereof, heating the wort by applying heat to portions of the exterior of said vessel, and continually abrading portions of the interior of said vessel that are opposite the portions of the exterior of said vessel that are heated to prevent a build-up of wort protein thereon by moving said abrading elements thereover, portions of the interior of said vessel being abraded as aforesaid by actuating said vessel.

References Cited by the Examiner

UNITED STATES PATENTS

| 2,322,749 | 6/1943 | Silhavy | 99—52 |
| 2,359,876 | 10/1944 | Schwaiger | 99—278 |
| 2,948,617 | 8/1960 | Paine | 99—52 |
| 3,001,467 | 9/1961 | Stackler | 99—278 |

A. LOUIS MONACELL, *Primary Examiner.*

D. M. STEPHENS, *Assistant Examiner.*